(12) United States Patent
Chen

(10) Patent No.: US 7,874,347 B2
(45) Date of Patent: *Jan. 25, 2011

(54) HEAT PIPE WITH HYDROPHILIC LAYER AND/OR PROTECTIVE LAYER

(75) Inventor: Ga-Lane Chen, Fremont, CA (US)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 1428 days.

This patent is subject to a terminal disclaimer.

(21) Appl. No.: 11/141,094

(22) Filed: May 31, 2005

(65) Prior Publication Data

US 2005/0269065 A1  Dec. 8, 2005

(30) Foreign Application Priority Data

Jun. 7, 2004 (CN) .................. 2004 1 0027633

(51) Int. Cl.
  *F28D 15/00* (2006.01)
(52) U.S. Cl. ............... 165/104.26; 165/104.21
(58) Field of Classification Search ........... 165/104.26, 165/104.21
See application file for complete search history.

(56) References Cited

U.S. PATENT DOCUMENTS

| | | | | |
|---|---|---|---|---|
| 3,587,725 A * | 6/1971 | Basiulis | ............... | 165/104.26 |
| 3,750,745 A * | 8/1973 | Moore, Jr. | ............... | 165/104.26 |
| 3,754,594 A * | 8/1973 | Ferrell | ............... | 165/104.26 |
| 3,786,861 A * | 1/1974 | Eggers | ............... | 165/104.26 |
| 3,875,926 A * | 4/1975 | Frank | ............... | 165/104.26 |
| 4,042,012 A | 8/1977 | Perry et al. | | |
| 4,142,576 A | 3/1979 | Perry et al. | | |
| 4,274,479 A * | 6/1981 | Eastman | ............... | 165/104.26 |
| 4,883,116 A | 11/1989 | Seidenberg et al. | | |
| 5,720,339 A * | 2/1998 | Glass et al. | ............... | 165/104.26 |
| 6,446,706 B1 * | 9/2002 | Rosenfeld et al. | ............... | 165/46 |
| 6,648,063 B1 * | 11/2003 | Andraka et al. | ............... | 165/104.26 |
| 6,695,974 B2 * | 2/2004 | Withers et al. | ............... | 252/70 |
| 6,766,817 B2 | 7/2004 | da Silva | | |
| 6,868,898 B2 * | 3/2005 | Chau et al. | ............... | 165/104.26 |
| 6,889,755 B2 * | 5/2005 | Zuo et al. | ............... | 165/104.26 |
| 6,936,233 B2 * | 8/2005 | Smalley et al. | ............... | 423/447.1 |
| 7,124,810 B2 * | 10/2006 | Lee et al. | ............... | 165/104.26 |
| 7,210,519 B2 * | 5/2007 | Chen | ............... | 165/104.26 |

(Continued)

FOREIGN PATENT DOCUMENTS

CN  2522409 Y  11/2002

(Continued)

*Primary Examiner*—Ljiljana (Lil) V Ciric
(74) *Attorney, Agent, or Firm*—Clifford O. Chi

(57) ABSTRACT

A heat pipe (1) includes a shell (20), a protective layer (10) formed on an outer surface of the shell, a wick (30) and a hydrophilic layer (40) sequentially formed on an inner surface of the shell, and a working fluid contained in the shell. A material of the shell is metal, such as copper, aluminum, or a copper-aluminum alloy. The protective layer is formed of nanomaterials, such as carbon nanotubes, nano-sized copper particles, nano-sized aluminum particles, or nano-sized particles of a copper-aluminum alloy. The wick is made from a mixture of carbon fibers and carbon nanocapsules. The hydrophilic layer is made from nanomaterials, for example, titanium dioxide, zinc oxide, alumina, or any mixture thereof.

20 Claims, 3 Drawing Sheets

U.S. PATENT DOCUMENTS

| | | | |
|---|---|---|---|
| 7,213,637 B2 * | 5/2007 | Lin et al. | 165/104.26 |
| 7,410,597 B2 * | 8/2008 | Chen | 252/71 |
| 7,579,077 B2 * | 8/2009 | Dubrow et al. | 428/357 |
| 7,694,726 B2 * | 4/2010 | Chen | 165/104.26 |
| 7,732,918 B2 * | 6/2010 | Dangelo et al. | 257/706 |
| 2001/0054495 A1 * | 12/2001 | Yevin et al. | 165/104.26 |
| 2002/0124995 A1 * | 9/2002 | Moon et al. | 165/104.11 |
| 2002/0139245 A1 * | 10/2002 | Kesten et al. | 95/52 |
| 2003/0141045 A1 * | 7/2003 | Oh et al. | 165/104.26 |
| 2005/0011572 A1 * | 1/2005 | Belcher | 138/137 |
| 2005/0056808 A1 * | 3/2005 | Leu et al. | 252/71 |
| 2005/0092467 A1 * | 5/2005 | Lin et al. | 165/104.26 |
| 2005/0126766 A1 * | 6/2005 | Lee et al. | 165/185 |
| 2005/0238810 A1 * | 10/2005 | Scaringe et al. | 427/249.1 |
| 2006/0016580 A1 * | 1/2006 | Lee et al. | 165/104.26 |
| 2006/0151153 A1 * | 7/2006 | Chen | 165/104.26 |
| 2006/0159916 A1 * | 7/2006 | Dubrow et al. | 428/357 |
| 2007/0235682 A1 * | 10/2007 | Chen | 252/70 |
| 2008/0019098 A1 * | 1/2008 | Sung | 361/705 |
| 2008/0128116 A1 * | 6/2008 | Dangelo et al. | 165/104.21 |

FOREIGN PATENT DOCUMENTS

JP     2003042674 A  *  2/2003

* cited by examiner

HEAT PIPE WITH HYDROPHILIC LAYER AND/OR PROTECTIVE LAYER

TECHNICAL FIELD

This invention relates to heat pipes and methods for forming the heat pipes, and more particularly to a heat pipe which can efficiently dissipate heat from an electronic component and a method for forming the same.

BACKGROUND

As computer technology continues to advance, electronic and electrical components such as central processing units (CPUs) and power supply units (PSUs) of computers are providing faster operational speeds and greater functional capabilities. When a CPU or a PSU operates at a high speed or a high capacity in a computer enclosure, its temperature may increase greatly. It is desirable to quickly dissipate the heat generated by the CPU or the PSU.

Numerous kinds of heat pipes have been developed for cooling electronic components. Conventionally, a heat pipe comprises an evaporator section to take in heat and a condenser section to pass out heat. Working fluid is contained in the heat pipe to transfer heat from the evaporator section to the condenser section. Heat entering the evaporator section of the heat pipe boils the fluid and turns it into a vapor. The vapor expands in volume and travels to the condenser section where it condenses to a liquid and releases its heat. The liquid is then returned to the evaporator section by gravity and/or a wick, whereupon the cycle starts again.

A conventional heat pipe does not begin to work until the electronic/electrical component to be cooled has reached a threshold temperature high enough to evaporate the working fluid. In general, the threshold temperature is between 30° C. and 40° C. That is, the electronic/electrical component must operate at a temperature of at least 30° C. One solution to decrease the threshold temperature of the working fluid is to improve the vacuum inside the heat pipe. However, this commonly requires high rigidity materials for the heat pipe shell, which increases the cost of manufacturing the heat pipe. Further, even slight damage to the heat pipe may result in leakage of air into the heat pipe and an increase in the vacuum pressure of the heat pipe. If this happens, the heat pipe may fail to work altogether.

A heat pipe generally has a variety of other limitations, such as a capillary pumping rate limit, a nucleate boiling limit and an entrainment limit, all of which constrain the ability of the heat pipe to cool electronic/electrical components. When the first of any of these limitations is reached, the heat pipe cannot provide any further improvement in its operating capacity. What is needed, therefore, is an improved heat pipe which can efficiently conduct heat from a heat generating component. What is also needed is a method for making such heat pipe.

SUMMARY

A heat pipe includes a shell, a wick formed on an inner surface of the shell, and a working fluid contained in the shell. In a preferred embodiment, the heat pipe includes a protective layer formed on an outer surface of the shell. In another preferred embodiment, the heat pipe includes a hydrophilic layer formed on the wick.

In another embodiment, a method for making the heat pipe includes the following steps: providing a metal plate; sequentially forming a wick and a hydrophilic layer on a surface of the metal plate; rolling the metal plate to form a tube, with the surface having the wick and the hydrophilic layer being inside the tube; filling a working fluid into the tube and vacuumizing the tube; and sealing the tube.

Preferably, before forming the wick and the hydrophilic layer on the surface of the metal plate, a surface treatment is performed on the metal plate. The surface treatment is applied on the metal plate by laser beams, for obtaining a desired surface roughness. A roughness of the metal plate after the surface treatment is in the range from 0.1 to 10 micrometers. The wick and the hydrophilic layer are formed by vacuum coating technology.

Due to the hydrophilic layer formed on the wick of the heat pipe, the capillarity of the wick is enhanced. Thus, the working fluid is driven to flow from a condenser section of the heat pipe back to an evaporator section of the heat pipe more rapidly. In addition, the protective layer on the outer surface of the shell maintains the degree of vacuum within the heat pipe in a desired range. Thus, the stability and working lifetime of the heat pipe are improved. Furthermore, employing surface treatment and vacuum coating technologies to make the heat pipe gives the heat pipe a more compact inner structure. Therefore, an efficiency of dissipation of heat of the heat pipe is improved.

Other advantages and novel features will become more apparent from the following detailed description of embodiments when taken in conjunction with the accompanying drawings, in which:

DETAILED DESCRIPTION OF THE EMBODIMENTS

The present invention is further described below and by reference to the figures.

Figure 1:
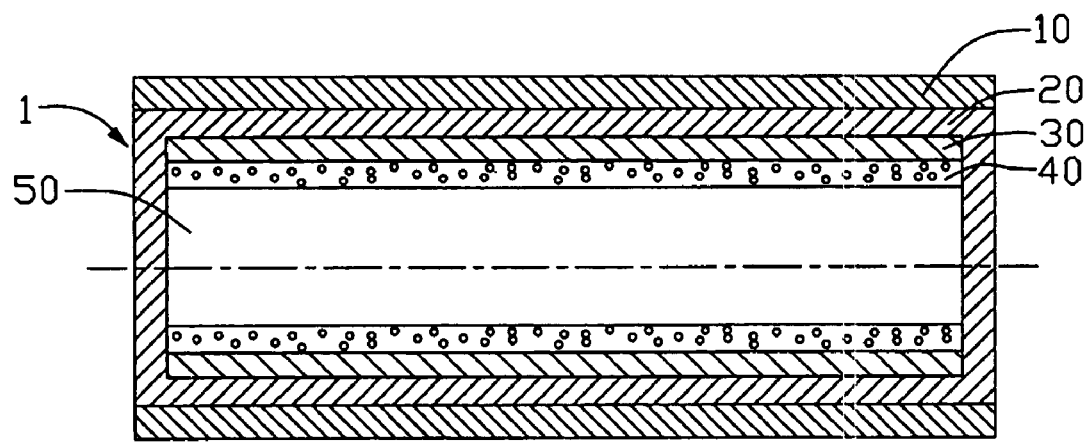
FIG. 1 is an axial cross-sectional view of a heat pipe in accordance with a preferred embodiment of the present invention, wherein the heat pipe includes a protective layer, a shell, a wick, and a hydrophilic layer in sequence.
Figure 2:
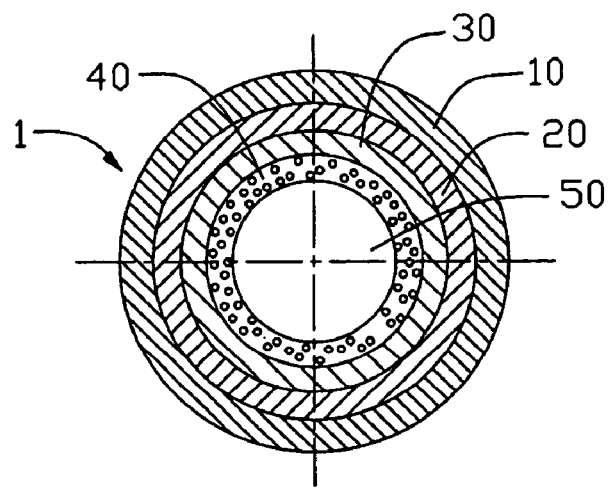
FIG. 2 is a transverse cross-sectional view of the heat pipe of FIG. 1.

Referring to FIGS. 1 and 2, a heat pipe 1 according to a preferred embodiment of the present invention includes a protective layer 10, a shell 20, a wick 30, a hydrophilic layer 40, and a working fluid (not shown), in that order from an outside to an inside thereof. The protective layer 10, the shell 20, the wick 30 and the hydrophilic layer 40 together form a chamber 50 in the heat pipe 1, for containing a certain volume of the working fluid. The working fluid is a liquid at room temperature and pressure, and has a low boiling point and stable chemical properties. The working fluid may be selected from the group comprising pure water, alcohol, methyl alcohol, acetone, ammonia, etc. Preferably, the working fluid has some nano-particles added thereinto, for improving a heat conductivity thereof. The nano-particles may be carbon nanotubes, carbon nanocapsules, nano-sized copper particles, or any suitable mixture thereof. In other words, the working fluid typically and preferably includes: (a) a liquid selected from the group consisting of pure water, alcohol, methyl alcohol, acetone, and ammonia; and (b) nano-particles selected from the group consisting of carbon nanotubes, carbon nanocapsules, nano-sized copper particles, and any suitable mixture thereof.

The protective layer 10 of the heat pipe 1 may be formed of nanomaterials, such as, for example, carbon nanotubes, nano-sized copper particles, nano-sized aluminum particles, nano-sized particles of a copper-aluminum alloy, and so on. The protective layer 10 has a thickness in the range from 10 to 500 nanometers. The nanomaterials may be formed on an outer surface of the shell 20 by vacuum coating technology. That is, the protective layer 10 is typically formed of nanomaterials selected from the group consisting of carbon nanotubes, nano-sized copper particles, nano-sized aluminum particles, and nano-sized particles of a copper-aluminum alloy. The protective layer 10 is used for maintaining the degree of vacuum within the heat pipe 1 in a desired range. As a result, the stability and working lifetime of the heat pipe 1 are improved. At the same time, the protective layer 10 helps the heat pipe 1 to compactly contact a heat source. In particular, the protective layer 10 can increase a contact area of the heat pipe 1 with the heat source. Further, the protective layer 10 can give the heat pipe 1 enhanced strength.

Figure 3:
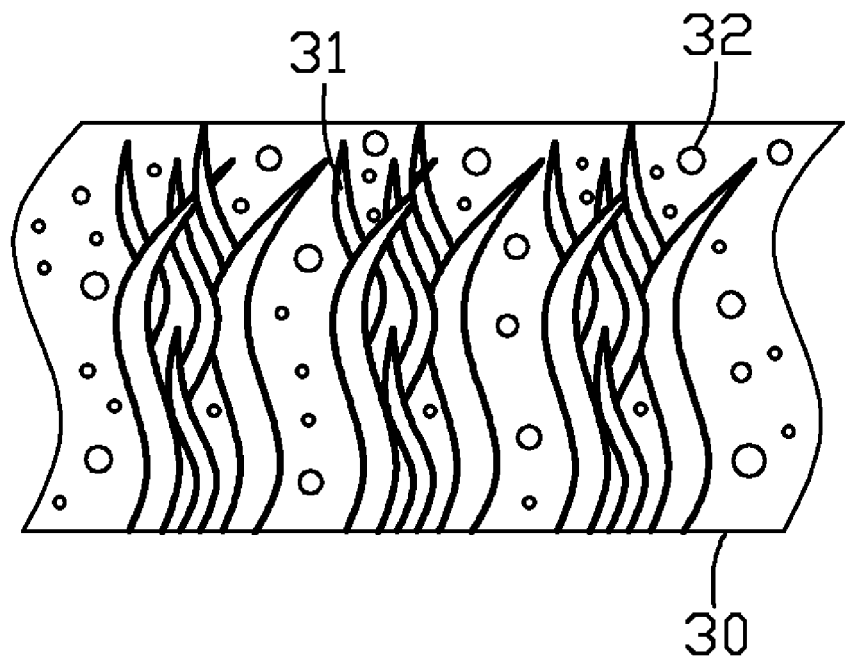
FIG. 3 is a schematic enlarged cross-sectional view of a material of the wick of the heat pipe of FIG. 1.

The shell 20 of the heat pipe 1 may be made from a material having good heat conductivity, such as, for example, copper, aluminum, a copper-aluminum alloy, and so on. In other words, the material of the shell 20 is typically a metal selected from the group consisting of copper, aluminum, and copper-aluminum alloy. The shell has a thickness in the range from 0.1 to 1 micrometers. The wick 30 of the heat pipe 1 has a thickness in the range from 0.1 to 0.5 micrometers. The wick 30 may be made from a mixture of carbon fibers 31 and carbon nanocapsules 32, as shown in FIG. 3. That is, the material of the wick 30 is exemplarily a mixture of carbon fibers 31 and carbon nanocapsules 32. Due to the addition of the carbon nanocapsules 32 in the carbon fibers 31, a contact area of the carbon fibers 31 with the working fluid is increased. Therefore, the capillarity of the wick 30 is enhanced, and the working fluid is driven to flow from a condenser section of the heat pipe 1 back to an evaporator section of the heat pipe 1 more rapidly.

The hydrophilic layer 40 of the heat pipe 1 may be formed on the wick 30 by vacuum coating technology. The hydrophilic layer 40 may be made from nanomaterials such as, for example, nanomaterials of titanium dioxide, zinc oxide, alumina, or any suitable mixture thereof. In other words, the hydrophilic layer 40 is typically made from nanomaterials selected from the group consisting of titanium dioxide, zinc oxide, alumina, and any suitable mixture thereof. The hydrophilic layer 40 has a thickness in the range from 10 to 200 nanometers. The hydrophilic layer 40 is apt to absorb condensed working fluid into the wick 30 of the heat pipe 1, and is therefore beneficial for the working fluid to flow back to the vaporization section of the heat pipe 1 rapidly. In addition, the materials of the hydrophilic layer 40 are antibacterial. Thus the hydrophilic layer 40 has a function of cleaning the working fluid, and maintaining the properties of the working fluid unchanged over a long period of time. Accordingly, the working lifetime of the heat pipe 1 is enhanced.

In another preferred embodiment, a method for making the above-described heat pipe 1 includes the following steps. The first step is to provide a metal plate having good heat conductivity and a thickness in the range from 0.1 to 1 micrometers. The metal plate may be made from copper, aluminum, a copper-aluminum alloy, and so on. The second step is to employ laser beams produced by a laser source to treat surfaces of the metal plate, thereby making a roughness of the surfaces of the metal plate in the range from 0.1 to 10 micrometers. The laser source is select from the group consisting of a solid yttrium aluminum garnet laser, a rubidium doped yttrium aluminum garnet laser, a rubidium doped yttrium vanadate laser, and an ultraviolet laser. The third step is to sequentially form the wick 30 and the hydrophilic layer 40 on a surface of the metal plate by vacuum coating technology. The vacuum coating is performed under a vacuum equal to or lower than $5 \times 10^{-6}$ Pa. In a preferred embodiment, the wick 30 and the hydrophilic layer 40 are formed under a vacuum of $2 \times 10^{-6}$ Pa. The vacuum coating technology may include evaporation coating, sputtering coating, etc. Then the protective layer 10 is formed on an opposite surface of the metal plate by the same vacuum coating technology. The protective layer 10 is made from nanomaterials, and has a thickness in the range from 10 to 500 nanometers. The nanomaterials may be carbon nanotubes, nano-sized copper particles, nano-sized aluminum particles, nano-sized particles of a copper-aluminum alloy, and so on. The fourth step is to roll the metal plate to form a tube, with the surface having the wick 30 and the hydrophilic layer 40 being on the inside of the tube. A longitudinal split in the tube is sealed, and a first end of the tube is sealed to form a precursor of the shell 20 of the heat pipe 1. The sealing can be performed by argon welding, neon welding, krypton welding, other inert gas welding, or by a rolling sealing method. The fifth step is to fill the working fluid into the tube, and vacuumize the tube. The last step is to seal an opposite second end of the tube by inert gas welding or rolling sealing to thereby form the heat pipe 1.

Employing the surface treatment and vacuum coating technologies to make the heat pipe 1 gives the heat pipe 1 a more compact inner structure.

Figure 4:
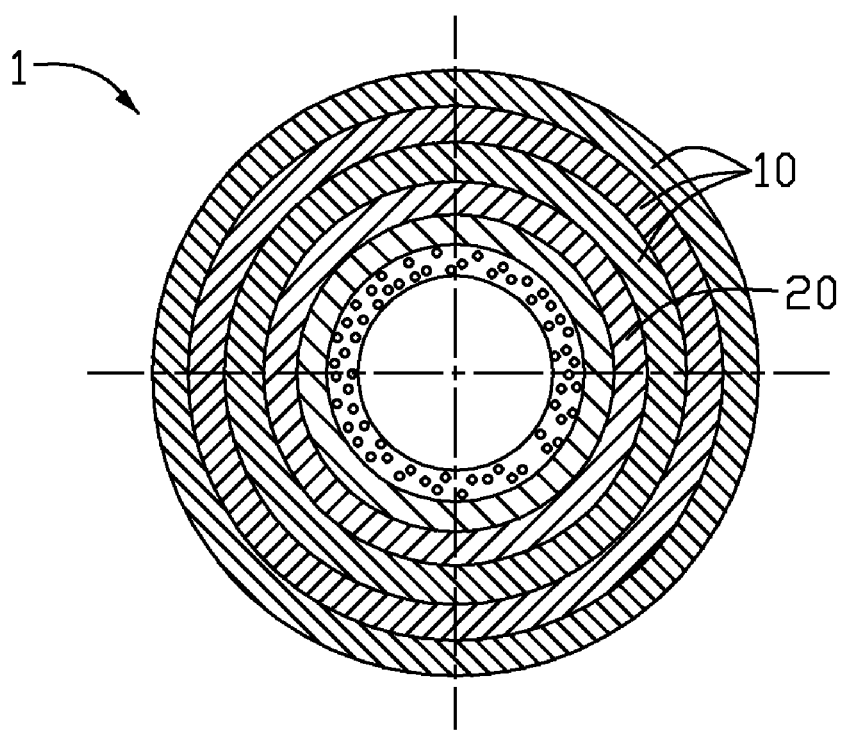
FIG. 4 is similar to FIG. 2, but showing the heat pipe further including a plurality of further protective layers.

It is to be understood that according to actual need, the heat pipe 1 may have a plurality of the protective layers 10 formed on the outer surface of the shell 20, as shown in FIG. 4. The protective layers 10 may be made from different materials, which have different permeabilities regarding a same gas. This can help to further reduce the adverse effects caused by permeability of gases, particularly the reduction in the degree of vacuum of the heat pipe 1. Therefore, the stability and working lifetime of the heat pipe 1 are improved. That is, the heat pipe 1 can include one or more protective layers 10. In other words, the heat pipe 1 includes at least one protective layer 10 formed on the outer surface of the shell 20.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A heat pipe comprising:
   a shell;
   a wick and a hydrophilic layer sequentially formed on an inner surface of the shell;
   at least one protective layer formed on an outer surface of the shell, the at least one protective layer being made from nanomaterials selected from the group consisting of carbon nanotubes, nano-sized copper particles, nano-sized aluminum particles, and nano-sized particles of a copper-aluminum alloy; and
   a working fluid contained in the shell.

2. The heat pipe of claim 1, wherein the at least one protective layer comprises a plurality of protective layers, which are made from different materials.

3. The heat pipe of claim 1, wherein the at least one protective layer has a thickness selected from the range from 10 to 500 nanometers.

4. The heat pipe of claim 1, wherein the wick comprises materials made from a mixture of carbon fibers and carbon nanocapsules.

5. The heat pipe of claim 4, wherein the wick has a thickness selected from the range from 0.1 to 0.5 micrometers.

6. The heat pipe of claim 1, wherein the hydrophilic layer is made from nanomaterials selected from the group consisting of nanomaterials of titanium dioxide, zinc oxide, alumina, and any mixture thereof.

7. The heat pipe of claim 6, wherein the hydrophilic layer has a thickness selected from the range from 10 to 200 nanometers.

8. A heat pipe comprising:
a tubular shell;
a wick formed on an inner peripheral surface of the shell;
a hydrophilic layer formed on an inner peripheral surface of the wick;
at least one protective layer formed on an outer surface of the shell, a thickness of the at least one protective layer being selected from the range from 10 to 500 nanometers; and
a working fluid sealed in the shell.

9. The heat pipe of claim 8, wherein the at least one protective layer comprises a plurality of protective layers, which are made from different materials.

10. The heat pipe of claim 8, wherein the wick is made from a mixture of carbon fibers and carbon nanocapsules.

11. The heat pipe of claim 8, wherein the wick has a thickness selected from the range from 0.1 to 0.5 micrometers.

12. The heat pipe of claim 8, wherein the hydrophilic layer is made from nanomaterials selected from the group consisting of nanomaterials of titanium dioxide, zinc oxide, and any mixture thereof.

13. The heat pipe of claim 12, wherein the hydrophilic layer has a thickness selected from the range from 10 to 200 nanometers.

14. The heat pipe of claim 8, wherein the at least one protective layer comprises nanomaterials selected from the group consisting of carbon nanotubes, nano-sized copper particles, nano-sized aluminum particles, and nano-sized particles of a copper-aluminum alloy.

15. The heat pipe of claim 8, wherein the working fluid has nano-particles added therein, and the nano-particles are selected from the group consisting of carbon nanotubes, carbon nanocapsules, nano-sized copper particles, and any mixture thereof.

16. A heat pipe comprising:
a tubular shell;
a wick formed on an inner peripheral surface of the shell;
a hydrophilic layer formed on an inner peripheral surface of the wick;
at least one protective layer formed on an outer surface of the shell; and
a working fluid sealed in the shell, the working fluid comprising:
a liquid selected from the group consisting of pure water, alcohol, methyl alcohol, acetone, and ammonia; and
nano particles selected from the group consisting of carbon nanotubes, carbon nanocapsules, nano-sized copper particles.

17. The heat pipe of claim 16, wherein the at least one protective layer consists of nanomaterials selected from the group consisting of carbon nanotubes, nano-sized aluminum particles, and nano-sized particles of a copper-aluminum alloy.

18. The heat pipe of claim 17, wherein the at least one protective layer comprises a plurality of protective layers, which are made from different materials.

19. The heat pipe of claim 16, wherein the hydrophilic layer consists of nanomaterials selected from the group consisting of titanium dioxide, zinc oxide, and any mixture thereof.

20. The heat pipe of claim 19, wherein the wick consists of a mixture of carbon fibers and carbon nanocapsules.

* * * * *